United States Patent
Lin

(10) Patent No.: US 11,740,412 B2
(45) Date of Patent: Aug. 29, 2023

(54) STRUCTURE INCLUDING WAVEGUIDE AND ISOLATION SPACE

(71) Applicant: Taiwan Semiconductor Manufacturing Co., Ltd., Hsinchu (TW)

(72) Inventor: Shih-Wei Lin, Taipei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 5 days.

(21) Appl. No.: 17/213,960

(22) Filed: Mar. 26, 2021

(65) Prior Publication Data
US 2021/0405298 A1 Dec. 30, 2021

Related U.S. Application Data

(60) Provisional application No. 62/705,464, filed on Jun. 29, 2020.

(51) Int. Cl.
  *G02B 6/30* (2006.01)
  *G02B 6/122* (2006.01)

(52) U.S. Cl.
  CPC ........... *G02B 6/305* (2013.01); *G02B 6/1228* (2013.01)

(58) Field of Classification Search
  CPC .. G02B 6/12004; G02B 6/122; G02B 6/1228; G02B 6/305; G02B 2006/12085; G02B 2006/12176; G02B 2006/122; G02B 2006/12111
  See application file for complete search history.

(56) References Cited

U.S. PATENT DOCUMENTS

| | | | |
|---|---|---|---|
| 7,612,638 B2 | 11/2009 | Chung et al. | |
| 10,571,633 B1 | 2/2020 | Chen et al. | |
| 10,649,140 B1 | 5/2020 | Bian et al. | |
| 2004/0114899 A1 | 6/2004 | Mattsson | |
| 2007/0274654 A1 | 11/2007 | Choudhury et al. | |
| 2009/0274418 A1 | 11/2009 | Holzwarth et al. | |
| 2016/0077293 A1 | 3/2016 | Jou et al. | |
| 2019/0187373 A1 | 6/2019 | Shubin | |
| 2020/0003950 A1* | 1/2020 | Yu | G02B 6/124 |

FOREIGN PATENT DOCUMENTS

| | | |
|---|---|---|
| CN | 101359071 B | 2/2009 |
| CN | 110622374 A | 12/2019 |
| CN | 110648974 A | 1/2020 |
| DE | 102019117173 A1 | 1/2020 |
| TW | 201937223 A | 9/2019 |

* cited by examiner

*Primary Examiner* — Michael P Mooney
(74) *Attorney, Agent, or Firm* — Haynes and Boone, LLP

(57) ABSTRACT

Structures and methods including a waveguide having a cladding layer surrounding a core layer disposed over a substrate, a cavity extending into the substrate adjacent the waveguide, a fiber disposed in the cavity, and an isolation space extending into the substrate and disposed under the waveguide. A plurality of holes may extend through the cladding layer adjacent the core layer.

20 Claims, 12 Drawing Sheets

STRUCTURE INCLUDING WAVEGUIDE AND ISOLATION SPACE

PRIORITY CLAIM

This application claims the benefit of U.S. Provisional Application No. 62/705,464, filed on Jun. 29, 2020, which is hereby incorporated by reference in its entirety.

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs.

Optical waveguides, which confine and guide electromagnetic waves, are used as components in integrated optical circuits that provide various photonic functions. Integrated optical waveguides typically provide functionality for signals imposed on optical wavelengths in the visible spectrum and, with sub-micron dimensions, have even been observed to provide functionality for signals imposed on optical wavelengths in the infrared spectrum. However, the signals can suffer from loss during their propagation reducing the efficiency of the waveguide and device performance generally. Thus, while structures including waveguides are satisfactory in some respects, improvements these devices and their fabrication including optical waveguides and their interface to other components are beneficial to meet efficiency demands.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
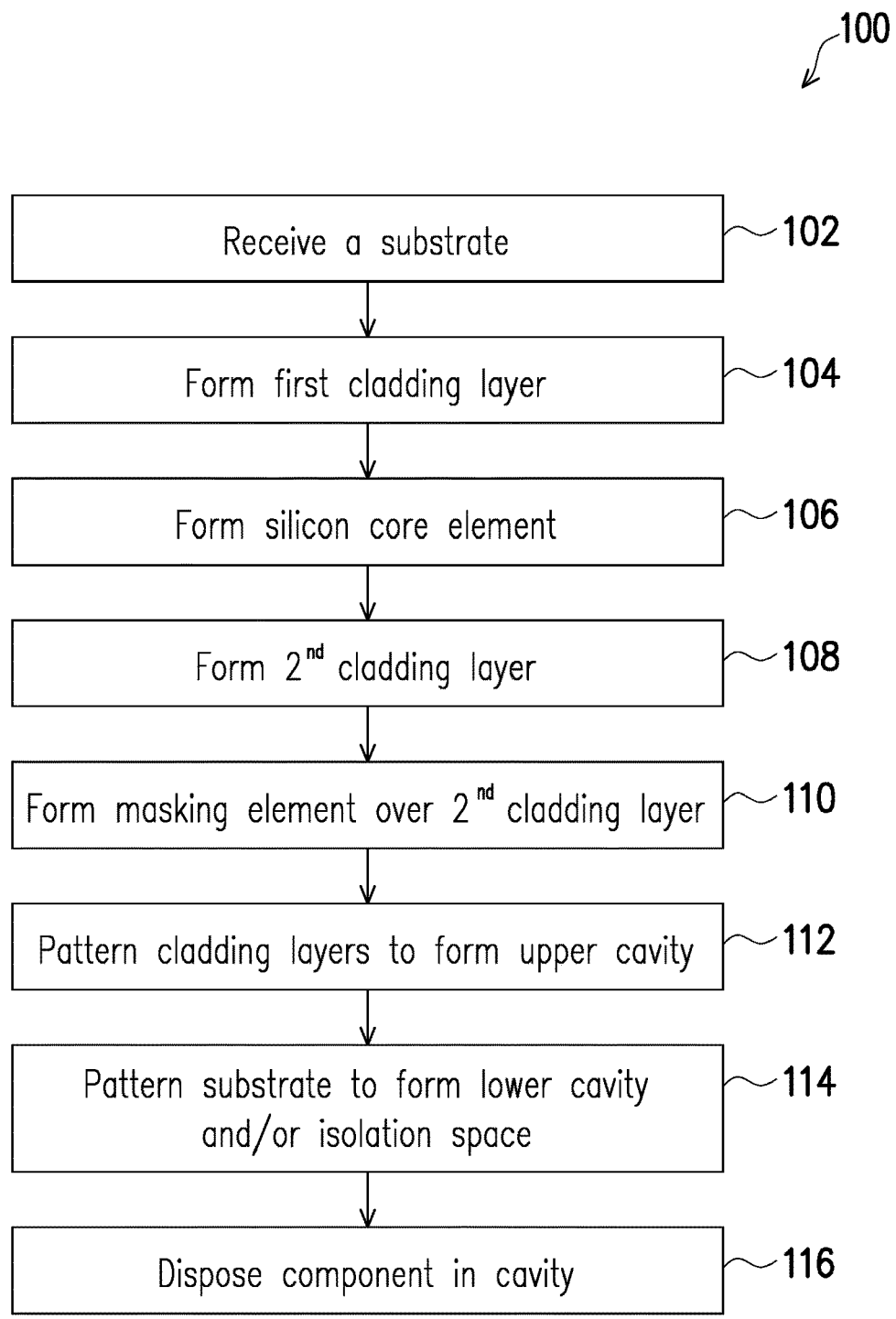
FIG. 1 illustrates a flowchart of an embodiment of a method for forming a device, according to one or more aspects of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Still further, when a number or a range of numbers is described with "about," "approximate," "substantially," and the like, the term is intended to encompass numbers that are within +/−10% of the number described, unless otherwise specified. For example, the term "about 5 nm" encompasses the dimension range from 4.5 nm to 5.5 nm.

The present disclosure is generally related to photonic systems including both optical devices and electrical devices, and the method of forming the same, in accordance with some embodiments. In particular, a photonic system is formed having an optical network that includes waveguides interfacing a component such as an optical fiber. Some of the methods and devices discussed herein advantageously provide for an isolation space underlying at least a portion of the waveguide and/or provide a cavity within which a component such as an optical fiber may be disposed relative to the waveguide.

For example, for a waveguide to effectively and efficiently interface with another component, the alignment between the component and the waveguide should be controlled. In some embodiments, the depth of the cavity within which the component is placed affects this alignment. In some implementations, the component placement needs to be precisely controlled such that there is a centering of the optical path in waveguide to the optical path in the component (e.g., fiber). One challenge of an implementation of an edge coupler, which can include a distal end of silicon core waveguide to be interfaced with a component such as a fiber, is that light propagating through the waveguide can be lost due to optical signal leakage. For example, the signal leakage can include leakage from the waveguide to a substrate on which the waveguide is disposed. Specifically, during signal transmission (from waveguide to fiber or from fiber to waveguide), a light tunneling phenomenon can occur, in particular at an end portion or distal portion (e.g., a tapered portion of the waveguide) of the waveguide adjacent to the fiber, resulting in optical signal loss. In other words, a light tunneling phenomenon means portions of the optical signal can leave the waveguide and extend into the substrate. In some embodiments discussed here, an isolation space between the waveguide and the substrate can be provided to mitigate this loss. This isolation space allows for reflection of lost light waves back to the waveguide. Some variations of some embodiments are discussed. Throughout the various views and illustrative embodiments, like reference numbers are used to designate like elements.

Referring to FIG. 1, illustrated is a method 100 of fabricating a device comprising a cavity and an isolation space. In some embodiments, the method 100 may be implemented by forming a first component, exemplified here by a waveguide, aligned with a second component, exemplified here by a fiber, disposed in a cavity adjacent the first component and an isolation space extending under the first component. In some implementations, the formed device or portion thereof may be referred to as an edge coupler as it provides a waveguide coupled to (via interfacing optical paths) an optical fiber.

It is understood that the method 100 includes steps having features of a complementary metal-oxide-semiconductor (CMOS) technology process flow and thus, are only described briefly herein. Additional steps may be performed before, after, and/or during the method 100. Method 100 is described below in conjunction with FIG. 2A through FIG. 7 that illustrate various top and cross-sectional views of a structure also referred to as a device 200 at various steps of fabrication according to the method 100, in accordance with some embodiments. FIG. 2B is a top view of the device 200, and includes annotations illustrating the plane of cross-section A-A' of FIG. 2A, E-E' of FIG. 2E and the particularized regions C and D of FIGS. 2C and 2D respectively. Similar cross-sectional plains are illustrated by the following figures.

The method 100 begins at block 102 where a substrate is provided. Referring to the example of FIG. 2A, a substrate 202 is provided. In an embodiment, the substrate 202 is a semiconductor substrate such as a silicon substrate. In an embodiment, the substrate 202 is formed as a silicon-on-insulator (SOI) substrate, discussed in further detail below. In an embodiment, the substrate 202 is silicon nitride. The substrate 202 may additionally or alternatively include other semiconductors such as germanium, silicon carbide (SiC), silicon germanium (SiGe), or diamond. Alternatively, the substrate 202 may include a compound semiconductor and/or an alloy semiconductor. Further, the substrate 202 may optionally include various doping configurations depending on design requirements as is known in the art, one or more epitaxial layers (epi-layers), may be strained for performance enhancement, and/or have other suitable enhancement features.

It is noted that a fragmentary view of substrate 202 is shown. The device discussed herein may be part of an integrated optical circuits formed on the substrate 202. The device 200 may further include various other devices and features, such as other types of devices such as transistors, bipolar junction transistors, resistors, capacitors, inductors, diodes, fuses, but is simplified for a better understanding of the inventive concepts of the present disclosure.

The method 100 then proceeds to block 104 where first cladding layer is formed over the substrate 202. Referring to the example of FIG. 2A, a first cladding layer 204 is disposed over the substrate 202. In an embodiment, the first cladding layer 204 is an oxide such as silicon oxide. Other exemplary compositions include other oxides, low-k dielectrics, and/or other compositions with a refractive index (N1) lower than the refractive index of the core layer (N2), as discussed below and illustrated in FIG. 2D. The refractive index, or index of refraction, is a material-dependent value measuring the propagation of a ray of light in the material.

In an embodiment, the thickness of the first cladding layer 204 is between approximately 0.5 microns and approximately 4 microns, for example, 2 μm. In various examples, the first cladding layer 204 may be deposited by a CVD process, a subatmospheric CVD (SACVD) process, a flowable CVD process, an ALD process, a PVD process, and/or other suitable process.

The method 100 then proceeds to block 106 where a core layer is formed over the first cladding layer. The core layer may comprise a composition that has a refractive index (N2, FIG. 2D) higher than that of the first cladding layer, discussed above, and higher than that of the second cladding layer, discussed below. In an embodiment, the core layer is silicon. In another embodiment, the core layer is silicon nitride. The core layer may form or be patterned to form the core element of a waveguide as discussed below.

Figure 2A:
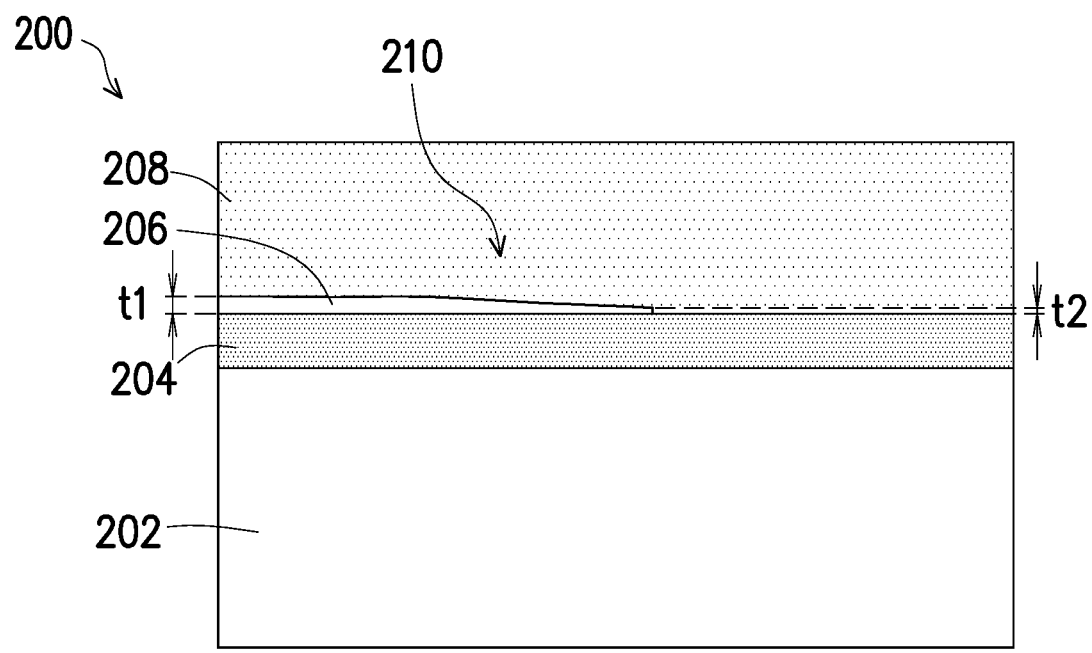
FIGS. 2A, 2E, 3A, 4A, 5A, 5C, 6A and 7 illustrate fragmentary cross-sectional views of an embodiment of a device during a fabrication process according to the method of FIG. 1, according to one or more aspects of the present disclosure.
Figure 2B:
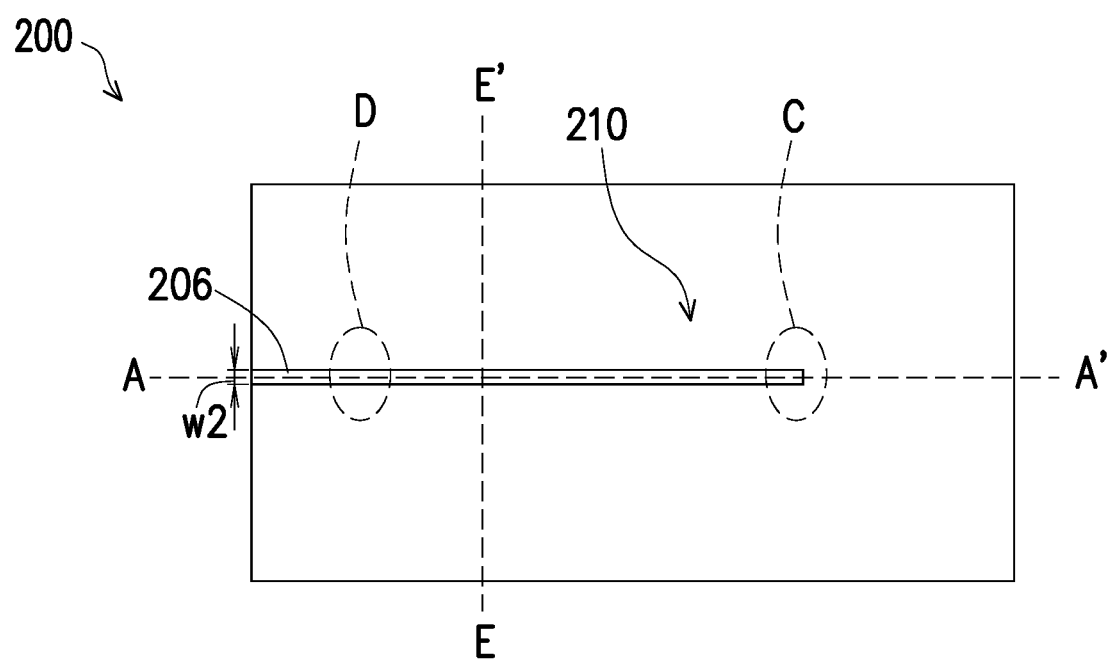
FIGS. 2B, 2C, 2D, 3B, 4B, 5B, and 6B illustrate fragmentary top views of an embodiment of a device during a fabrication process according to the method of FIG. 1 and corresponding to the device of FIGS. 2A, 3A, 4A, 5A and 6A respectively, according to one or more aspects of the present disclosure.

Referring to the example of FIG. 2A, a core layer 206 is disposed over the first cladding layer 204. Importantly, the core layer 206 has a refraction index greater than that of the first cladding layer 204. In some embodiments, the core layer 206 has a refraction index (RI) ranging from 1.8 to 4. For example, in an embodiment, the core layer 206 is silicon nitride, which can have a refractive index of approximately 2.0. As another example, in an embodiment the core layer 206 is silicon, which can have a refractive index of approximately 3.5. In an embodiment, the core layer 206 has a thickness ranging from 80 nm to 500 nm. For example, in some embodiments, the core layer is approximately 90 to 150 nm. The dimensions of the core layer are provided to form a suitable propagation path for the light to be transmitted.

Forming the core element over the substrate in block 106 may include forming a conformal layer of material of the core layer. The conformal layer may be patterned to provide a shape suitable for performance as a core element of a waveguide. Specifically, the core layer is patterned to provide a path through which light propagates. The patterning of the core layer may include a photolithography process, such as, for example, forming a photoresist layer over the substrate and the core layer material, exposing the resist to a pattern, performing post-exposure bake processes, and developing the resist to form a masking element including the resist. In some embodiments, patterning the resist to form the masking element may be performed using an electron beam (e-beam) lithography process. The patterning may be performed prior to the depositing of the second cladding layer, discussed below with reference to block 108.

Figure 2C:
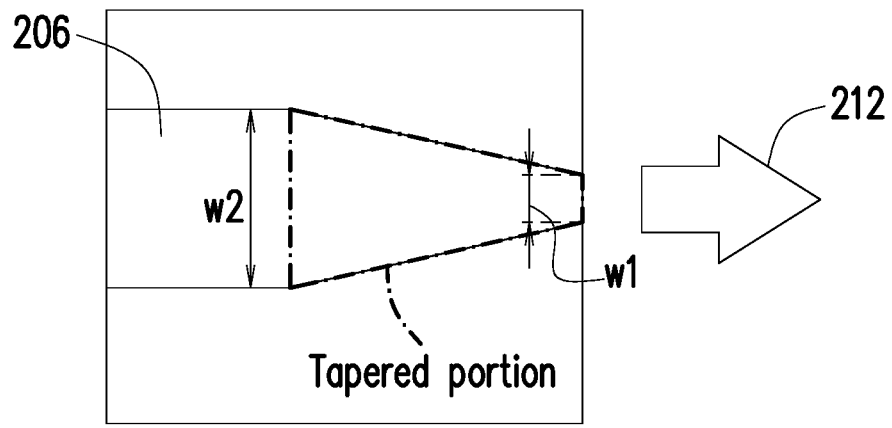

In addition to patterning the core layer to provide the propagation path across a portion of the substrate 202, the core layer may also be patterned to provide a tapered distal (end) region. FIG. 2B illustrates a top view of the core layer 206 extending over the substrate 202 and first cladding layer 204 where the core layer terminates in a distal end. In an embodiment, the core layer is an element having a width w2 of its main portion extending over the substrate. As illustrated in the top view of FIGS. 2B, 2C, and 2D, the core layer 206 includes a width w2 over the first cladding layer 204 through which the light propagates. Adjacent to the main portion of the core layer 206 having a width w2, the core layer includes a tapered end portion adjacent a distal end of the core layer, for example, the core layer tapers to a width of w1. FIG. 2C is illustrative of a distal end of the core layer as it tapers from the width w2 to a width w1. This taper may also be present at the end of the core layer in FIG. 2B (not shown). The tapering of an end region of the core layer 206 is further illustrated by the tapering of a vertical thickness dimension t1 to a thickness dimension t2 in FIG. 2A. The thickness dimension t2 is less than thickness t1, for example by 10-90%.

In some embodiments, the width w2 may be between approximately 100 and 300 nm, for example, 140 nm. Tapered width w1 may be between approximately 40 and 300 nm. The tapered width w1 may be 10-90% less than the wide width w2. In an embodiment, the width w2 may be approximately 0.9-1.2*the thickness t1 of the core layer. In an embodiment, the vertical thickness t1 may be between approximately 500 and 100 nm. The tapered vertical thickness t2 may be between approximately 30 nm and 100 nm. This tapering of the core layer, in the vertical thickness and horizontal width dimensions, narrows the propagation path and suitably allows for the waveguide to interface another component, thus, may be referred to as an edge coupler or portion thereof.

The method 100 then proceeds to block 108 where a second cladding layer is formed over the core layer. The first and second cladding layer together surround the core layer providing in effect a tube of the patterned core layer within which the light propagates. Referring to the example of FIGS. 2A and 2E, a second cladding layer 208 is disposed over the substrate 202. In an embodiment, the second cladding layer 208 is an oxide such as, silicon oxide. Other exemplary compositions include other oxides, low-k dielectrics, and/or other compositions with a refractive index lower than that of the core layer, discussed below. In an embodiment, the thickness of the second cladding layer 208 is between approximately 0.5 and 4 microns, for example, 1.8-2.2 μm. The second cladding layer 208 may be substantially the same thickness as the first cladding layer 204. In various examples, the second cladding layer 208 may be deposited by a CVD process, a subatmospheric CVD (SACVD) process, a flowable CVD process, an ALD process, a PVD process, and/or other suitable process. As illustrated in the cross-sectional view of FIG. 2E, the second cladding layer surrounds the sidewalls of the patterned core layer 206.

Together, the first cladding layer 204, the core layer 206, and the second cladding layer 208 provide a waveguide 210. In some embodiments, the waveguide 210 transmits electromagnetic radiation in the visible section of the electromagnetic spectrum. The core layer 206 provides an optical medium, surrounded by a medium with lower refractive index—the cladding layers. Visible light that is injected into an end of the integrated optical waveguide (e.g., using a lens, a grating coupler or prism coupler, not shown) and is guided along a length of the waveguide 210 by way of total internal reflection within the core layer 206 due to the difference in refractive indices between the core layer 206 and the surrounding medium—cladding layers 204 and 208.

Figure 2D:
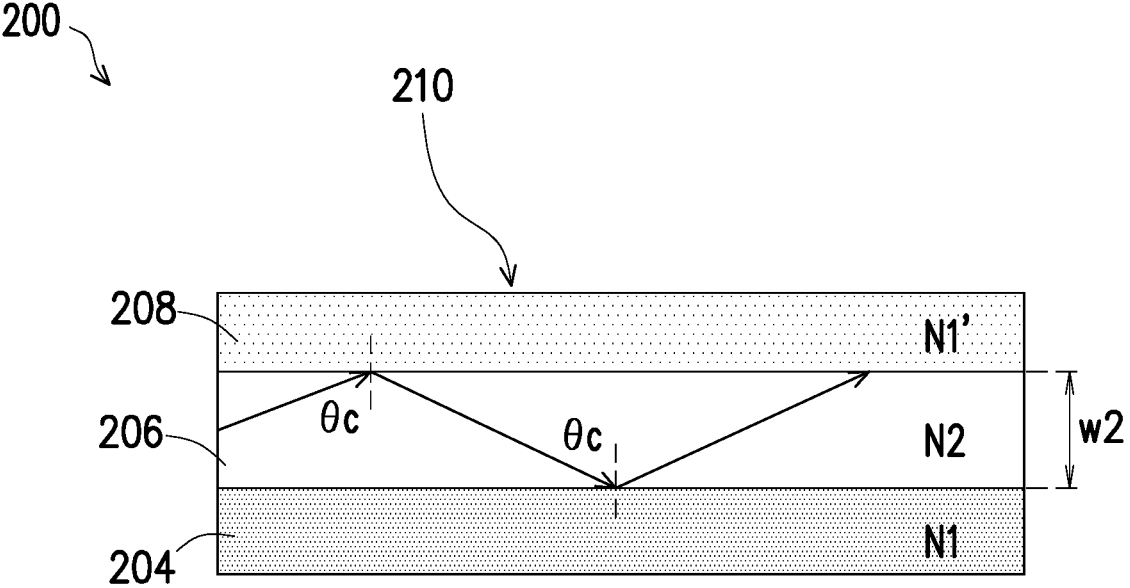
Figure 2E:
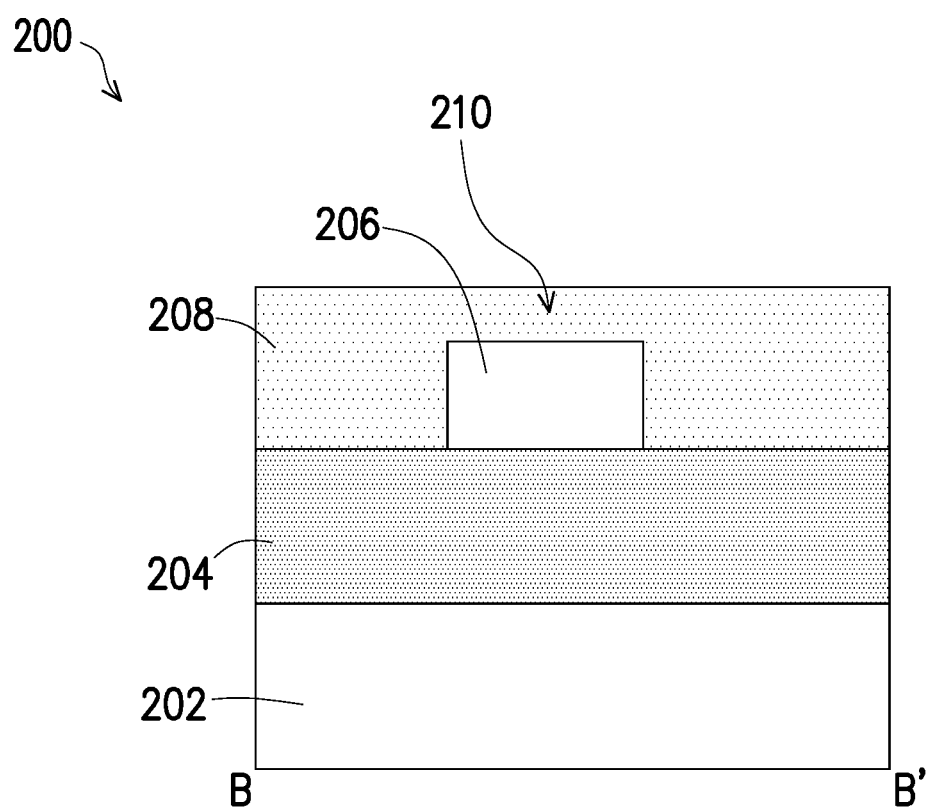

The propagation of radiation in the visible section of the electromagnetic spectrum, referred to as light, in a portion of the waveguide 210 is illustrated in FIG. 2D. Because the refractive index of each of the first/second cladding layers (N1 and N1' respectively) are less than the index of refraction for the core layer (N2), the core layer acts as a dense medium within which the light 212 can propagate by internal reflection. If the incident angle of the light reflecting through the core layer 206 is greater than the critical angle, $\theta c$, then the wave (light) is totally reflected and the waveguide provides internal reflection thus, propagating the light along the waveguide. It is noted, the critical angle, $\theta c$, is based on the indices of refraction of the materials of the waveguide. Thus, a light wave propagates inside the patterned core layer 206 in a "zigzag" way along the waveguide tunnel.

In an embodiment, the first cladding layer and the second cladding layer comprise the same material. In an embodiment, the first cladding layer and/or the second cladding layer comprise silicon oxide and thus, have a refractive index of approximately 1.45. In an embodiment, the substrate 202 and the core layer 206 comprise the same material. For example, in an embodiment, the substrate 202 and the core layer 206 are silicon. The refractive index of silicon is approximately 3.47.

While it is desired for total reflection as illustrated in FIG. 2D, in some embodiments, there is leakage of rays from the core layer 206 (e.g., insufficient to meet the critical angle) thus reducing the efficiency of the light transfer. In some embodiments, escaped light carries to the substrate 202, which may have an index of refraction greater than the cladding layers, and thus, the light is not reflected back to the core layer, but lost to the substrate 202. As discussed below, in some embodiments, providing a region (isolation space) with an index of refraction lower than the core layer and cladding layers, allows for reflection back to the core layer thus improving the efficiency of light propagation.

In an embodiment, the first cladding layer 204 is a buried oxide (BOX) layer of an SOI substrate and the core layer 206 is a portion of a semiconductor (e.g., silicon) layer formed thereover. An SOI substrate is a silicon-insulator-silicon substrate, which can be implemented in some technologies to improve performance (e.g., parasitic capacitance). In some embodiments, an SOI substrate includes a silicon—silicon oxide—silicon stack. In a further embodiment, the first silicon provides the substrate 202 of the embodiment of FIG. 2A, the silicon oxide provides the first cladding layer 204 of the embodiment of FIG. 2A, the core layer may be patterned of the overlying silicon layer. Various methodologies are suitable for forming the SOI substrate are suitable including SIMOX (separation by implantation of oxygen), where implanting oxygen forms the buried oxide layer; wafer bonding; and epitaxially growing a silicon upper layer over the insulator layer.

After formation of the waveguide element as discussed above, the method 100 then proceeds to block 110 where a masking element is formed over the waveguide element. The masking element may be fabricated using suitable processes including photolithography. The photolithography process may include forming a photoresist layer over the device, exposing the resist to a pattern, performing post-exposure bake processes, and developing the resist to form a masking element including the resist. In some embodiments, patterning the resist to form the masking element may be performed using an electron beam (e-beam) lithography process. In some embodiments, a patterned photoresist layer is used to pattern a hard mask layer that provides the masking element or portion thereof.

The pattern provided by the masking element may define release holes and/or define a region for a cavity adjacent the waveguide. In an embodiment, the cavity is the region in which a component such as an optical fiber is positioned.

Figure 8:
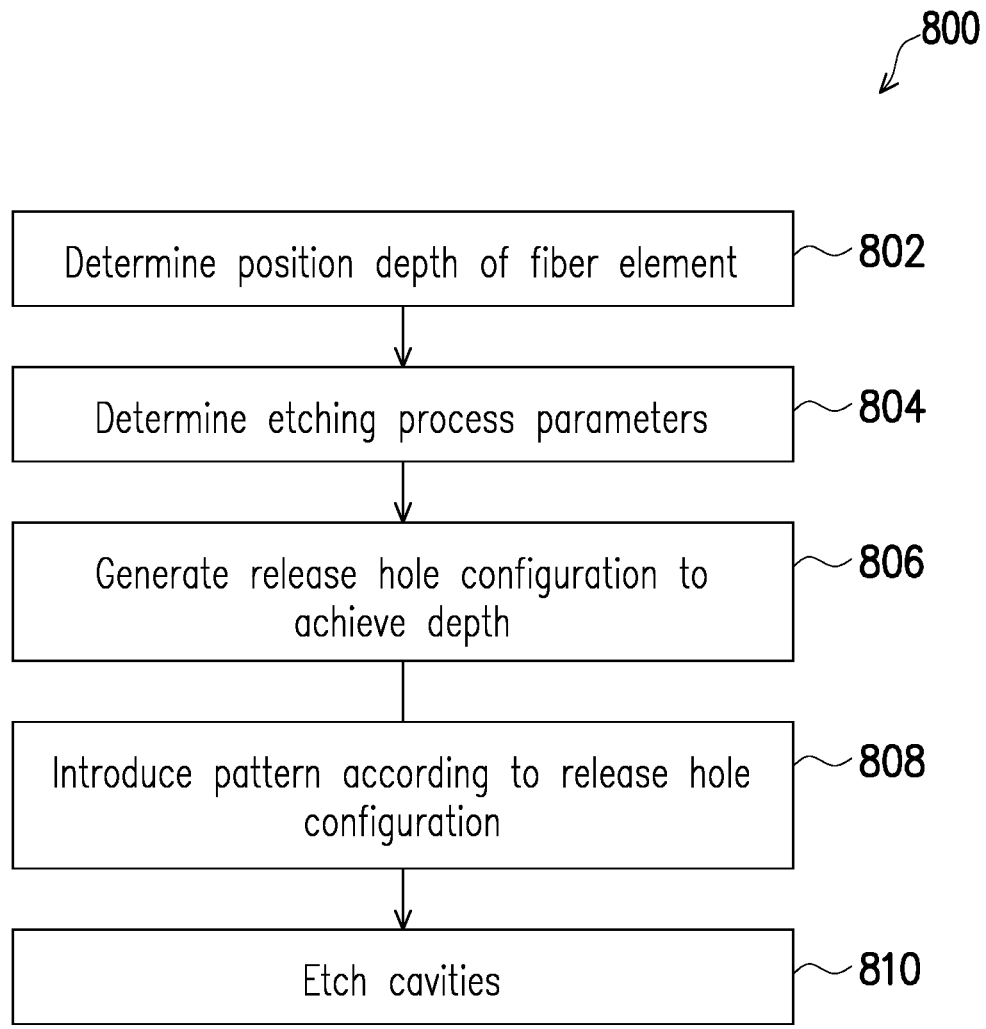
FIG. 8 illustrates a flowchart of an embodiment of a method for determining and providing a release hole configuration to form an isolation space corresponding to various steps of the method 100 of FIG. 1, according to one or more aspects of the present disclosure.

The cavity location and dimensions (e.g., depth) can define the positioning of the component relative to the waveguide. The release holes defined by the pattern may be openings to be formed in the cladding layer(s) of the waveguide that allow for an isolation region to be formed under the waveguide element, as discussed below. FIG. 8 provides an embodiment of a method 800 of determining the pattern of the release holes to be defined by the masking element, which may be implemented, for example, in conjunction with block 110.

Figure 3A:
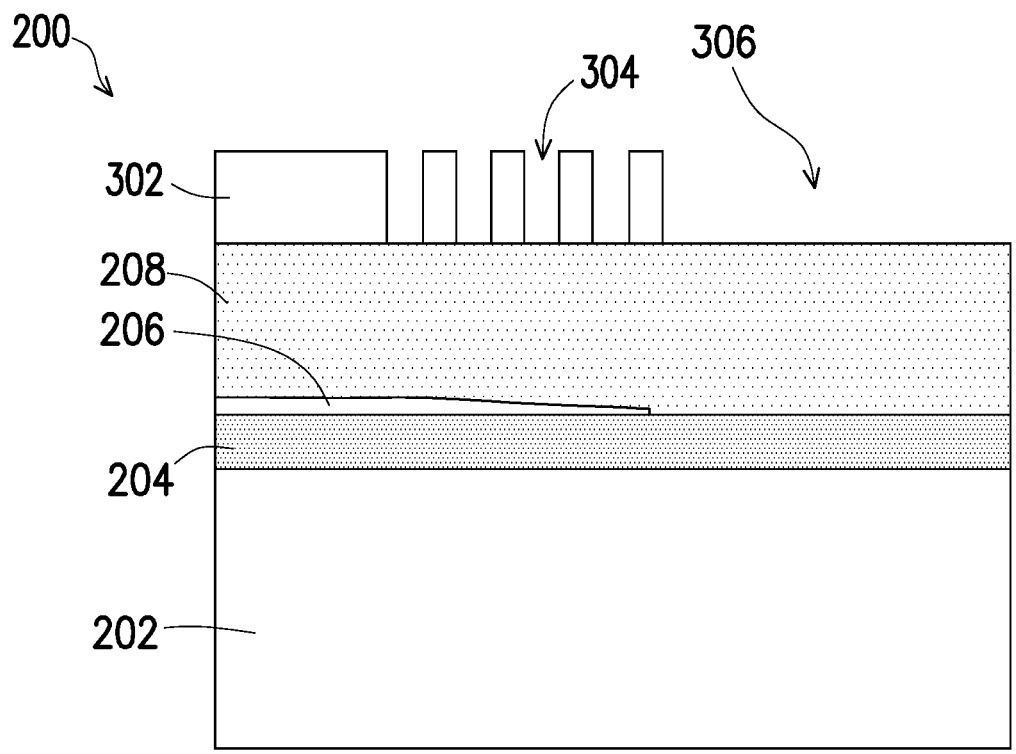
Figure 3B:
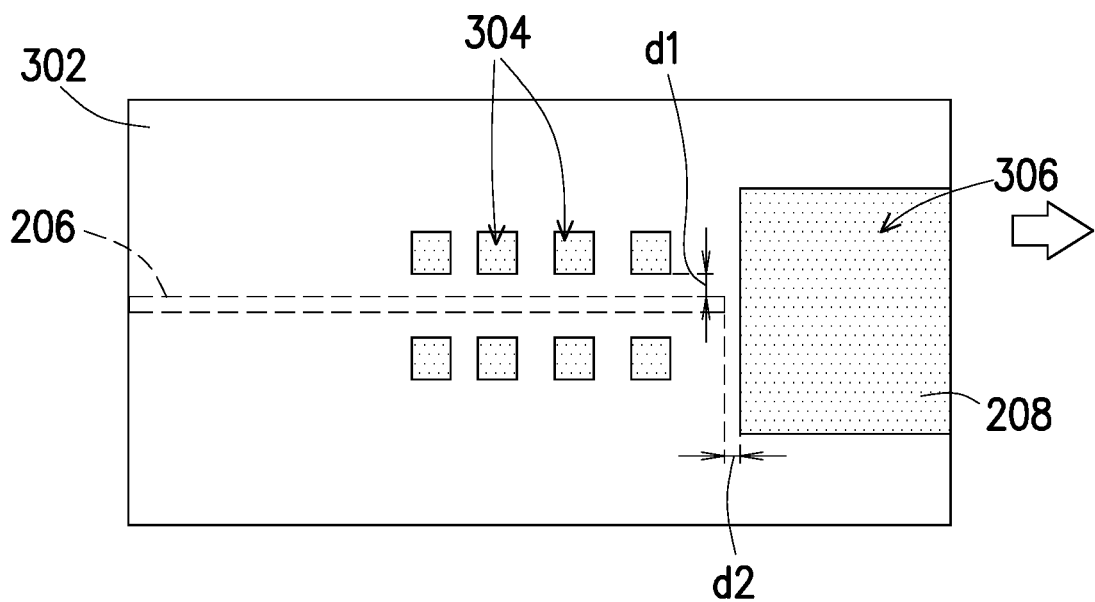

In an exemplary embodiment, FIGS. 3A and 3B illustrate a masking element 302 disposed over the substrate 202. The masking element 302 defines the pattern for subsequently formed release holes and cavity as discussed below. Specifically, the masking element 302 includes a plurality of openings 304 defining the release holes. The masking element 302 includes an enlarged opening 306 that defines a cavity for a component such as the optical fiber.

When viewed from a top view of the device, the openings 304 are aligned such that the release holes defined by said openings 304 are spaced apart (e.g., laterally) from the core layer 206. This distance is selected such that it is sufficient to prevent the etchant from interfacing with and possibly damaging the core layer when patterning the structure as discussed in blocks 112 and 114 of the method 100 below. That is, a lateral distance d1 is provided between the patterned opening 304 and the core layer 206. In some embodiments, approximately 10 µm≤d1≤approximately 50 µm.

When viewed from a top view of the device, the opening 306 is aligned such that the cavity defined by said opening 304 is spaced apart (e.g., laterally) from a distal end of the core layer 206. This distance is sufficient to prevent the etchant from interfacing with and possibly damaging the core layer when patterning the structure as discussed in blocks 112 and 114 of the method 100. That is, a lateral distance d2 is provided between the patterned opening 304 and a distal end of the core layer 206. In some embodiments, approximately 10 µm≤d2≤approximately 50 µm.

The pattern of the masking element 302 illustrates four (4) openings 304 on each opposing side of the core layer 206 of the waveguide 210. See FIGS. 3A and 3B. This configuration and quantity is exemplary only. The configuration of release holes is not limited to this quantity or shape of openings. Rather, the quantity, size, configuration including shape, and density of the openings 304 is determined based on the desired isolation space in conjunction with formation of a cavity of a specified depth as discussed below including with respect to the method 800 of FIG. 8. In some embodiments, the pattern may provide release holes of varying size or shape from one another.

The openings 304 lie vertically above the first and second cladding layers and spaced a lateral distance from the core layer 206 as discussed above. A subset of the openings 304 lie vertically above and laterally spaced from the tapered portion of the core layer 206, that is, patterning a release hole laterally adjacent the core layer 206 having a width less than w2. Another subset of the openings 304 lie vertically above and laterally spaced from the wider portion of the core layer 206, that is, patterning a release hole laterally adjacent the core layer 206 having a width of w2. In an embodiment, at least one opening 304 defines a release hole, or portion thereof, adjacent the wider portion of the core layer 206 and at least one opening 304 defines a release hole, or portion thereof, adjacent the narrower/tapered portion of the core layer 206.

The method 100 then proceeds to block 112 where structure, and in particular the cladding layers, are patterned according to the masking element of block 110. The etching of the underlying layers forms an upper cavity and/or release holes extending through the first/second cladding layers. In an embodiment, anisotropic dry etching process is used to pattern the underlying layers. The etching process may be selective to the material of the cladding layers. Referring to the example of FIGS. 4A and 4B, release holes 402 are provided through the first cladding layer 204 and the second cladding layer 208. In an embodiment, the release holes 402 provided in block 112 terminate at a top surface of the substrate 202. The release holes 402 extend through the cladding layers 204/208 and are laterally adjacent and spaced a distance from the core layer 206 (e.g., d1 above). Example dimensions for the release holes 402 include from approximately 5 µm to 50 µm (e.g., in width). The release holes 402 are sufficient size to provide access for the etchant for the processes discussed below. Release holes 402 too great in size may cause structural integrity issues, allow for etchant to be introduced in a manner that may adversely affect the waveguide, and/or other possible issues.

In an embodiment, the release holes 402 are etched by anisotropic dry etching process. In a further embodiment, the etchant is selective to the composition of the first/second cladding layers 204/208 and substantially does not etch the composition of the substrate 202 (e.g., silicon). For example, in some implementations, the etchant is selective to a silicon oxide of the first/second cladding layer 204/208. In an embodiment, the etching process may implement a fluorine-comprising etch gas (for example, $F_2$, $CH_3F$, $CH_2F_2$, $CHF_3$, $CF_4$, $C_2F_6$, $SF_6$, and/or $NF_3$).

Figure 4A:
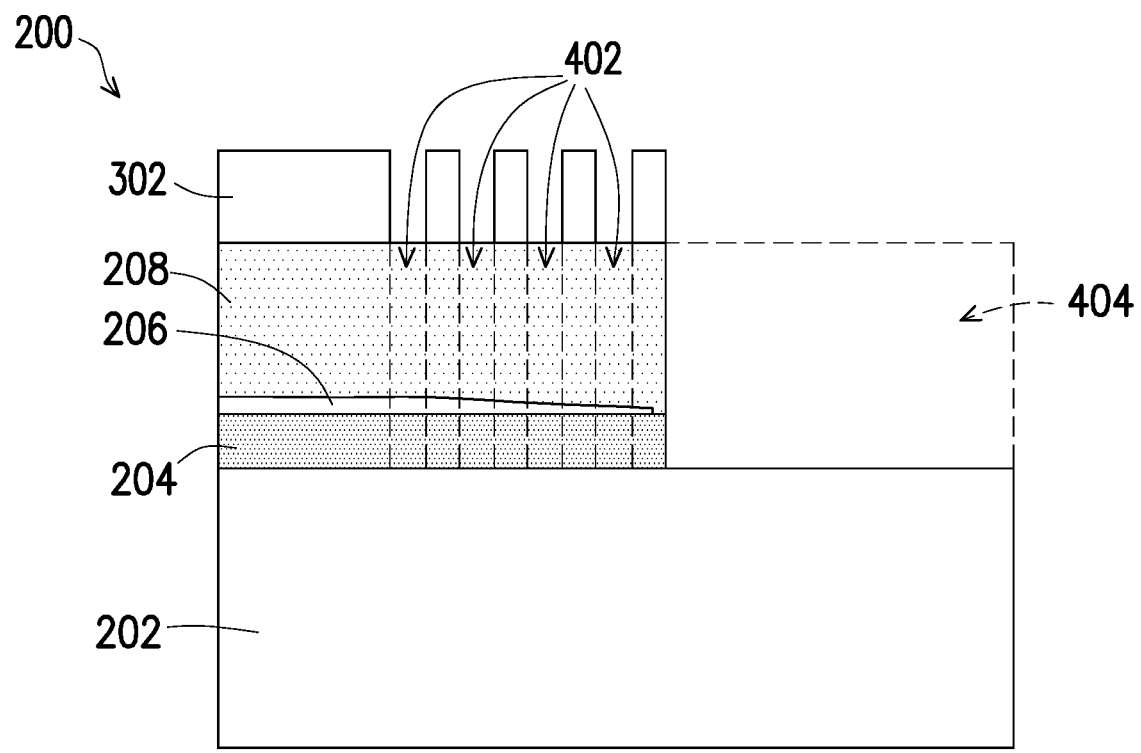
Figure 4B:
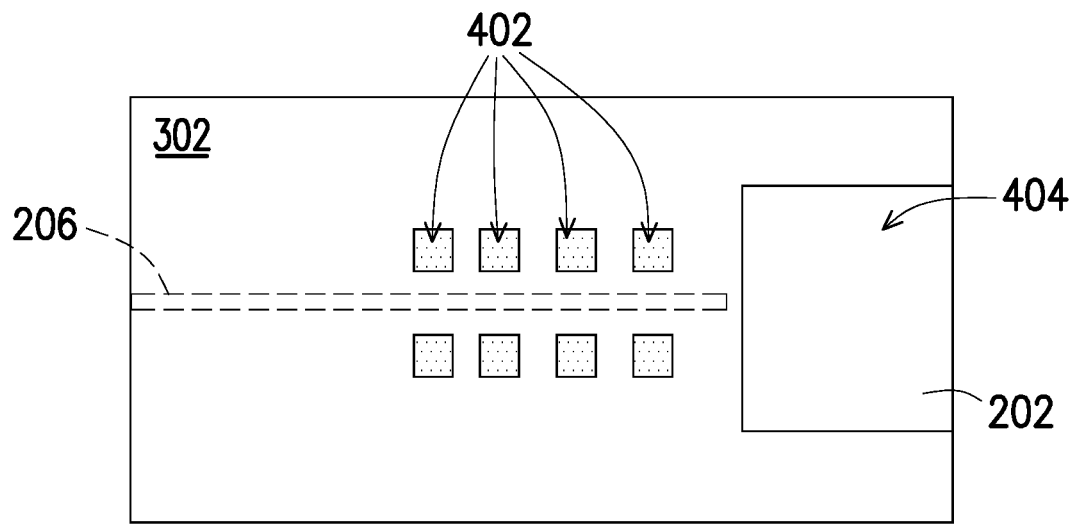

Referring to the example of FIGS. 4A and 4B, a cavity 404 is provided through the first cladding layer 204 and the second cladding layer 208. In an embodiment, the cavity 404 provided in block 112 terminates at a top surface of the substrate 202. The cavity is laterally adjacent and spaced a distance from the tapered distal end of the core layer 206 (e.g., d2 above).

In an embodiment, the cavity 404 is etched by a suitable anisotropic dry etching process. In a further embodiment, the etchant is selective to the composition of the first/second cladding layer 204/208 and substantially does not etch the composition of the substrate 202 (e.g., silicon). For example, in some implementations, the etchant is selective to a silicon oxide of the first/second cladding layer as opposed to the silicon of the substrate 202.

Advantageously, in some embodiments, the cavity 404 and the release holes 402 are formed concurrently, e.g., the same time, in a single etching process using a single patterned masking element 302. This can provide a benefit of formation of the release holes without a separate and distinct masking and/or etching step. In other embodiments, the process may include a separate formation of the release holes and the cavity.

The method 100 then proceeds to block 114 where the method includes patterning the substrate to form a lower cavity and/or an isolation space under the waveguide element. The lower cavity is contiguous with the upper cavity provided by block 112. Together with the upper cavity, the lower cavity provides suitable space to position a component, such as an optical fiber within the cavity. Further, a surface (e.g., bottom) of the lower cavity provides a mechanism for aligning the fiber element with the waveguide element. In an embodiment, the alignment positions the paths along which the light propagates in the respective elements such that they can interface and provide a continuous path. In an embodiment, the alignment positions the axis of each element as discussed further below.

In some embodiments, in block 114, along with the patterning of the substrate to form the lower cavity, an isolation space is formed below the waveguide element. The isolation space is contiguous with the overlying release holes provided in block 112. The isolation space is formed by introduction of etchant through the release holes to the exposed surface of the substrate below the release holes. The cavity and/or isolation space may be formed by a suitable etching process such as, dry etch or wet etch. In an embodiment, the etching process forming the lower cavity and/or the isolation space is an isotropic etch process.

In some embodiments, the isolation space and the lower cavity are formed together, for example, defined by a single masking element and formed by a single etching step. This can provide a benefit of formation of the isolation space and lower cavity without a separate and distinct masking and/or etching steps.

Figure 5A:
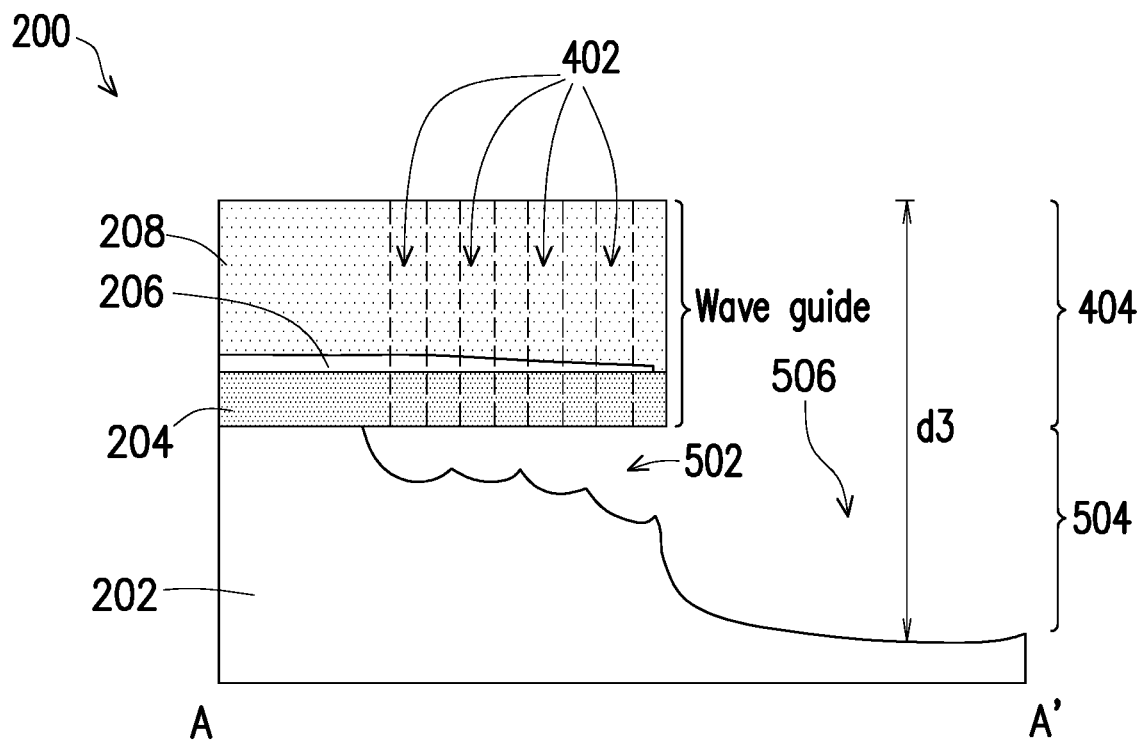
Figure 5B:
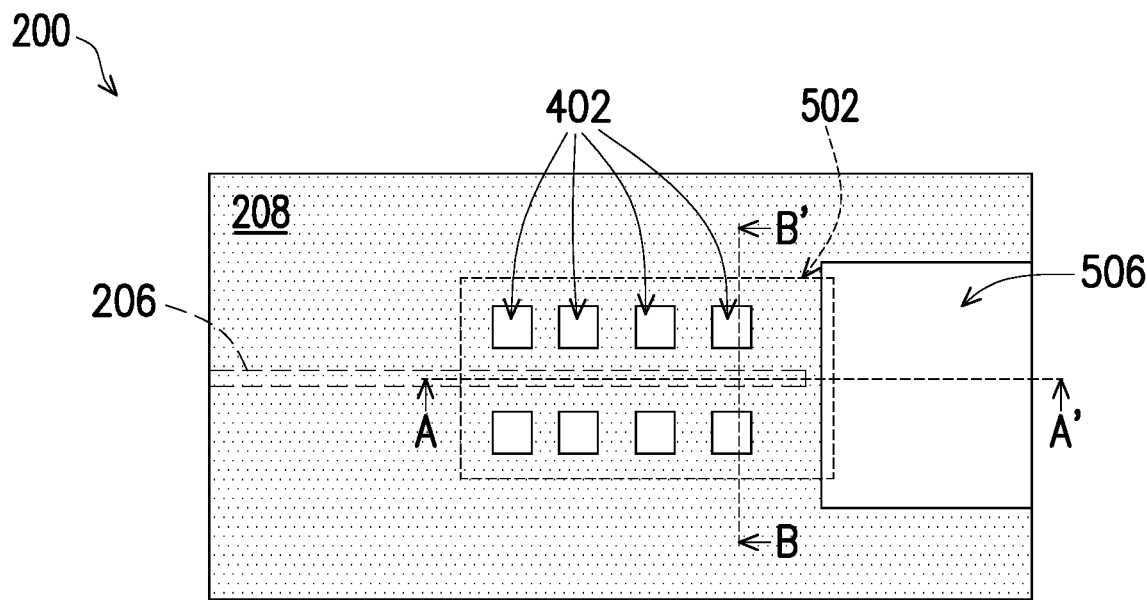
Figure 5C:
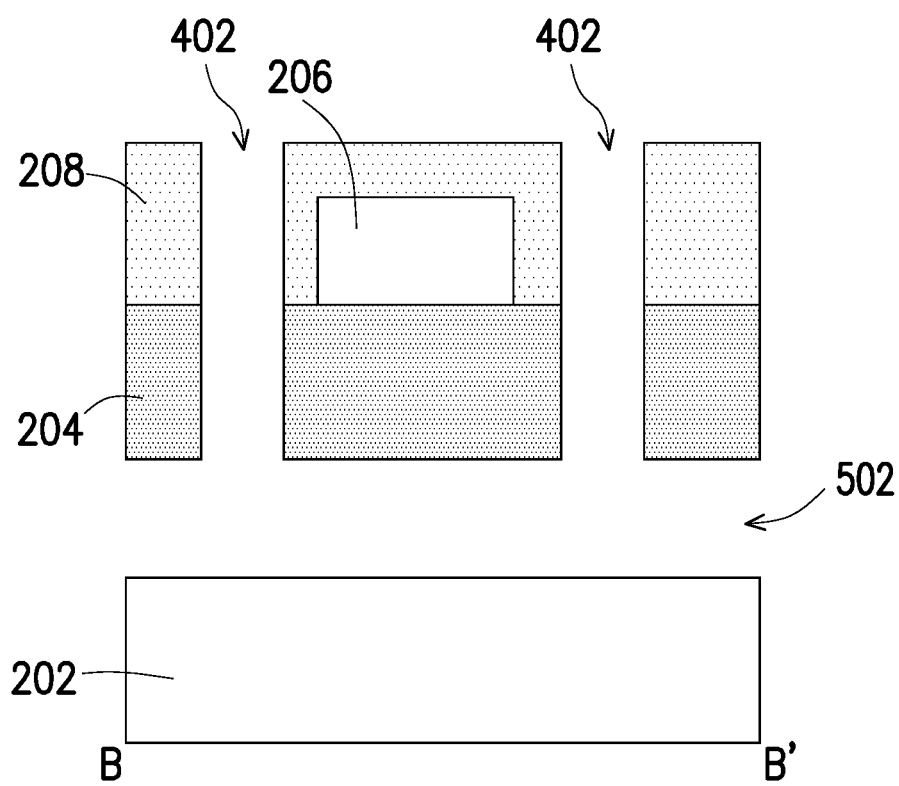

Referring to the examples of FIGS. 5A, 5B, and 5C, an isolation space 502 is formed under the waveguide 210 and a lower cavity 504 is formed contiguous with the upper cavity 404 forming a single cavity 506. In an embodiment, the cavity 506 is filled with air. In an embodiment, the isolation space 502 is filled with air. In some implementations, the refractive index of air is approximately 1, less than that of the first cladding layer and the core layer. In some embodiments, the isolation space 502 and/or the cavity 506 is filled with another medium.

In some implementations, this medium again has a refractive index lower than that of the first and/or second cladding layers 204 and/or 208. For example, an adhesive material may be disposed within the cavity 506 and/or the isolation space 502. As the refractive index of the isolation space 502 is lower than that of the first cladding layer 204, optical signal leakage from the first cladding layer 204 can be reflected back to the core layer 206.

In some embodiments, the core layer 206 has a tapered portion having a wide portion (e.g., w2) and a tapered distal end providing a narrow side (e.g., w1) as discussed above. The isolation space 502 extends from the cavity 506, under the tapered distal end, to at least under at least a portion of the wide portion (w2). In doing so, in certain implementations, the isolation space effectively reduces the optical loss. This is because the isolation space 502 between first cladding layer 204 and substrate 202 is suitable to prevent light tunneling or to reduce light propagation loss to the substrate. For sufficient structural strength, the length of the isolation space 502 may be less than the length of the core layer 206. The isolation space 502 may have a depth of between approximately 10 and 100 μm. The depth of the isolation space is selected to consider the structural rigidity, process considerations of additional etch time and possible damage to surrounding components (e.g., waveguide), and sufficient performance of reduction in optical loss.

As illustrated by FIG. 5C, the release holes 402 are contiguous with the isolation space 502. The release holes 402 act as delivery channels allowing the etchant to access the exposed substrate 202 at the bottom of the release holes 402. Having capability for the etchant to interface the substrate, the etchant may selectively etch, for example, isotopically, the material of the substrate 202. In some embodiments, the bottom surface of the isolation space 502 may be slightly deeper just under a release hole 402 providing a scalloped surface as illustrated in FIG. 5A.

In some embodiments, the lower cavity 504 and the isolation space 502 are formed concurrently, for example, utilizing a single etching step. In a further embodiment, the lower cavity 504 and the isolation space 502 are formed using the masking element 302 provided above in block 110 and 112, and thus, may provide a benefit of reducing the masking steps to form the isolation region and/or cavity.

In some embodiments, the etching of block 112 and 114 are performed concurrently and in-situ. In some embodiments, the etchant and/or etch configuration (e.g., isotropic and anisotropic) is modified from block 112 to block 114 but the etching process(es) are performed in-situ.

The etch parameters (e.g., time) of block 114 are selected to provide a suitable depth d3 of the cavity 506 based upon the component to be positioned within the cavity 506. Specifically, in an embodiment, the cavity depth d3 is provided such that when rested on the bottom surface of the cavity 506, a component is aligned, for example, center-axis alignment, with the waveguide 210. In an embodiment, the cavity depth d3 is provided such that the light propagation path of the waveguide 210 is aligned with the propagation path of the fiber in the cavity as discussed with reference to FIG. 7 below. This selected depth d3 may affect the configuration of release holes required to etch the desired isolation space concurrently with the etch to provide the cavity depth d3, this is discussed below with reference to the method 800 of FIG. 8. In other words, the configuration of release holes is chosen such that sufficient isolation space is formed concurrently during an etch process that is tuned to provide the selected depth d3. The depth of the isolation space 502 may be less than d3, for example, approximately 0.1 to 0.9*d3.

In some embodiments, after forming the cavity 506 and the isolation space 502, the masking element 302 is removed for example, by suitable etching or stripping processes.

The method 100 then proceeds to block 116 where a component such as an optical fiber is disposed in the formed cavity. Referring to the example of FIGS. 6A and 6B, a component 602 is positioned in the cavity 504. In some embodiments, the component 602 is an optical fiber. In some embodiments, the optical fiber transmit light between the two ends, where one end, illustrated, interfaces with the waveguide 210. As discussed above, one or more surfaces of the cavity 504 position the component 602 such that it is aligned with the waveguide 210. The isolation space 502 is continuous with the cavity 504. The isolation space 502 may extend laterally beyond the edges of release holes 402.

Figure 6A:
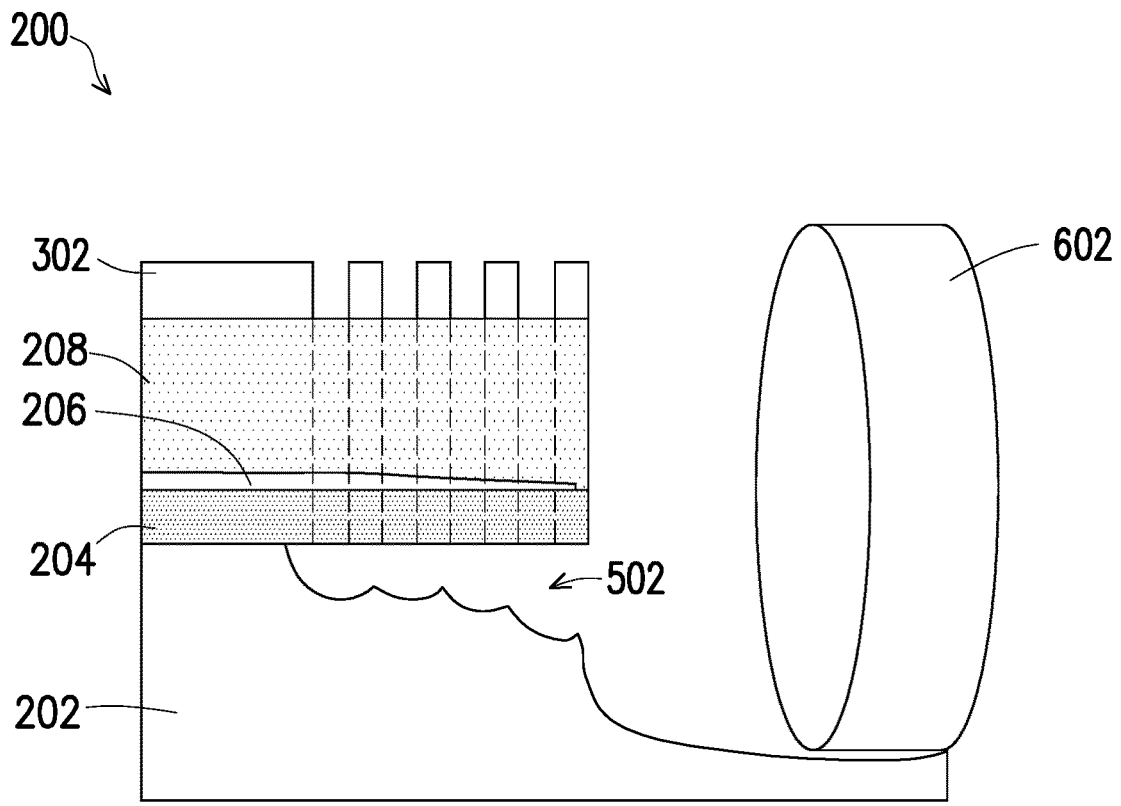
Figure 6B:
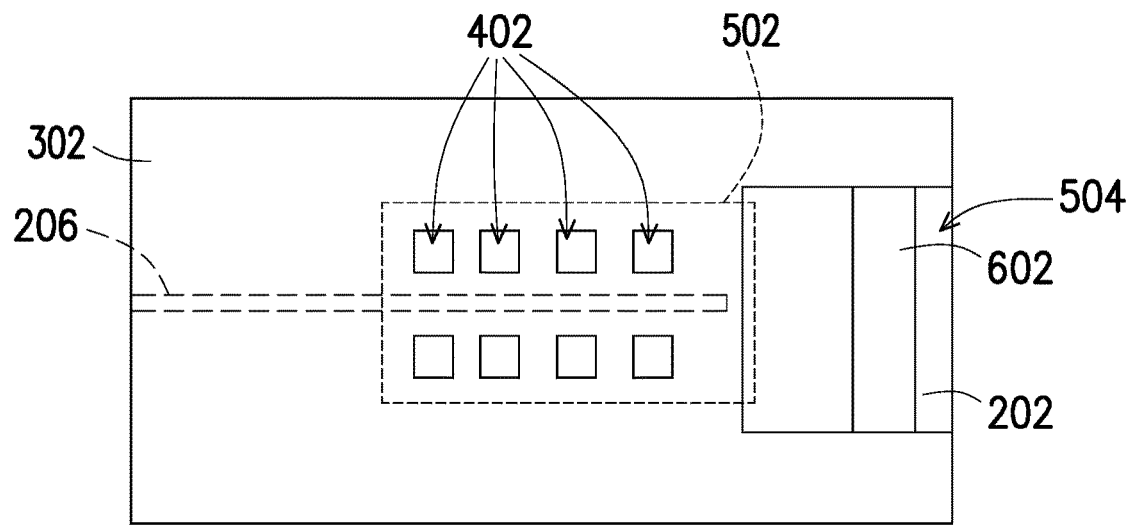
Figure 7:
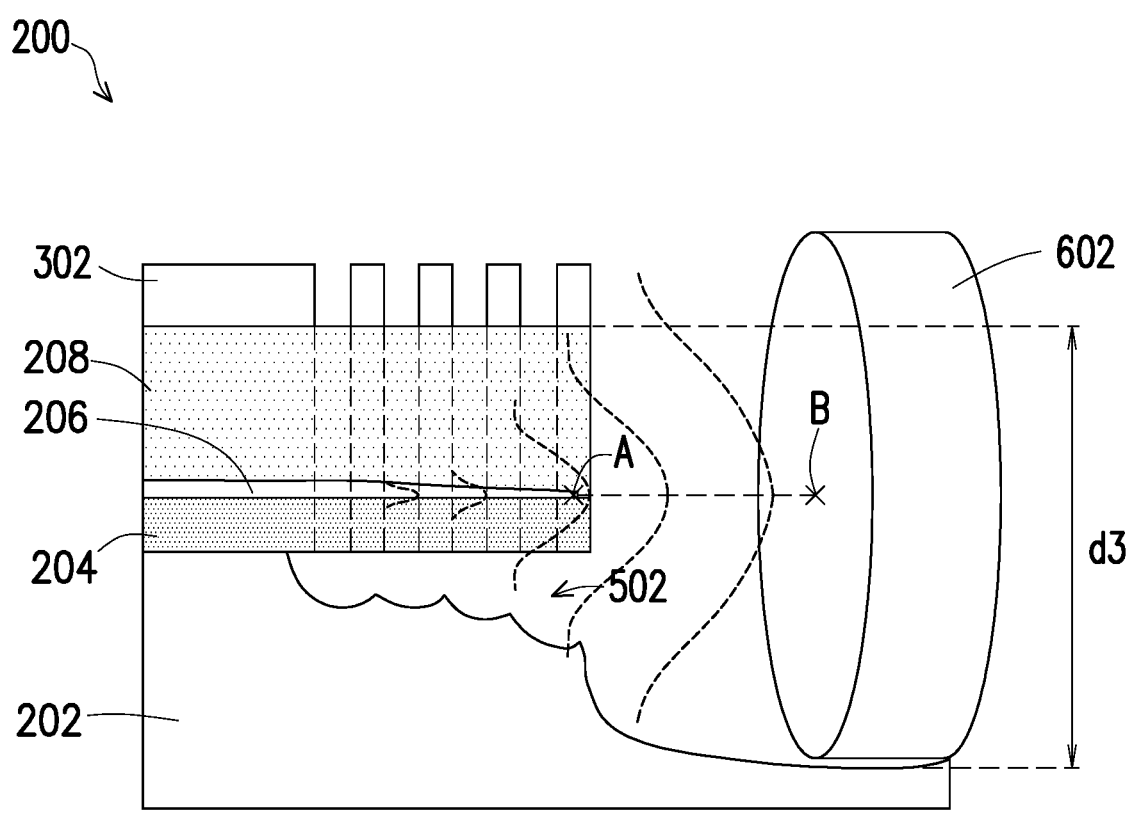

FIG. 7 is substantially similar to FIG. 6A and further illustrates a wave (e.g., visible light) 702 propagating through the waveguide 210 to the component 602, for example, a fiber. As illustrated, the axis A is a center axis of core layer 206. The axis B is a center axis of the fiber component 602. The axis A is aligned with axis B. In an embodiment, the axis A is the center of the propagation path (see FIG. 2D) of the waveguide 210 and the axis B is the center of the corresponding propagation path of the optical fiber provided as component 602. In some embodiments, the release holes 402 are filled with air in the final device.

While the above exemplary embodiments are directed to the positioning of a waveguide and fiber, a person of skill in the art would recognize that aspects of the present disclosure may be used for other devices and applications. For example, in an embodiment, the present methods are provided for a biosensor device. For example, using release holes to create an isolation space and cavity for a biosensor device and its interface with another component (e.g., sensor rather than a fiber).

As introduced above, the configuration of the release holes affects the etching rate of the substrate below the waveguide and thus, affects the dimensions of the isolation space. Referring to FIG. 8, illustrated a method 800 that includes defining the configuration of masking element used in the forming release holes along with forming the cavity within which the component will be formed as provided above in an embodiment of the method 100. The method 800 includes providing a masking element and associated etching parameters that allow for centering optical path in waveguide to optical path in fiber by precise cavity depth control and also forming an isolation space below the waveguide.

The method 800 or portions thereof may be used to determine the pattern of the masking element of block 110 as exemplified by masking element 302, including openings 304 and 306, of FIGS. 3A and 3B. That is, through the configuration of masking element 302 and associated etching processes (block 112, 114), the depth of the cavity 504 and the depth of isolation space 502, the width of the cavity 504 and the width of isolation space 502, and the length of the cavity 504 and the length of isolation space 502 are determined. In an embodiment, the dimensions of the cavity 504 are selected to provide alignment of the desired component and the waveguide. Thus, the etching process parameters, e.g., time and etchant, may be determined to provide the selected dimensions of the cavity 504. Using these etching constraints, the desired dimensions of the isolation space 502 formed concurrently with the cavity 504 may be controlled by changing the configuration of the release holes including, for example, their shape (e.g., as shown by the top-view), size, density, quantity and arrangement. This is because the configuration of the release holes affects the etchant volume reaching the substrate 202 through the release holes 402 and thus, affects the isolation space 502 dimensions.

The method 800 begins at block 802 where a position of a depth of a cavity suitable for a fiber element is determined. The cavity depth provides a suitable depth to support a fiber element such that its axis is aligned with a core element of the waveguide element. See FIG. 7. This cavity depth is determined in order to set the etching process parameters provided in block 804.

The method 800 then proceeds to block 804 where a determination of etching process parameters to form the desired cavity is provided. The etching process parameters are based on the etching rates associated with etchant of blocks 112 and 114 discussed above. The process parameters include the etchant, etchant concentration, time, temperature, and/or other suitable parameters that provide for an etching rate. The etching process parameters can be selected to provide the suitable cavity depth determined in block 802.

The method 800 proceeds to block 806 where a release hole configuration is provided to achieve the isolation space configuration desired for the structure, while applying the etching process parameters of block 804 and/or maintaining the desired cavity depth of block 802. The release hole loading effect can allow for, while the concurrent etching creates a cavity with a target depth, and an isolation space to be formed concurrently in a single patterning and using the same etch process(es). The loading effect of the release holes controls the placement and amount of etchant that enters the substrate region below the waveguide structure. The greater the loading, the more etchant is provided. In an embodiment, the larger each individual release hole is in area, the greater the etch rate is provided. For example, the larger the width of a release hole (e.g., w or d), the greater the etch rate. In an embodiment, the smaller the width of the release holes, the lower the etching rate.

In an embodiment, the configuration of the release holes includes a substantially rectangular shape (e.g., square), for example, as illustrated in FIG. 3B. In some embodiments, the top view shape of each release hole is round, rectangular or other polygonal shape. The shape of the release hole may affect the volume of etchant provided and the location of the etchant. The shape of the release hole may further be selected for ease of patternability. Additional release holes provide for greater isolation space dimension(s). The desired configuration of the isolation space, including its depth, may be determined based the performance targets for the structure, for example, a tolerated leakage of propagating light.

Figure 9:
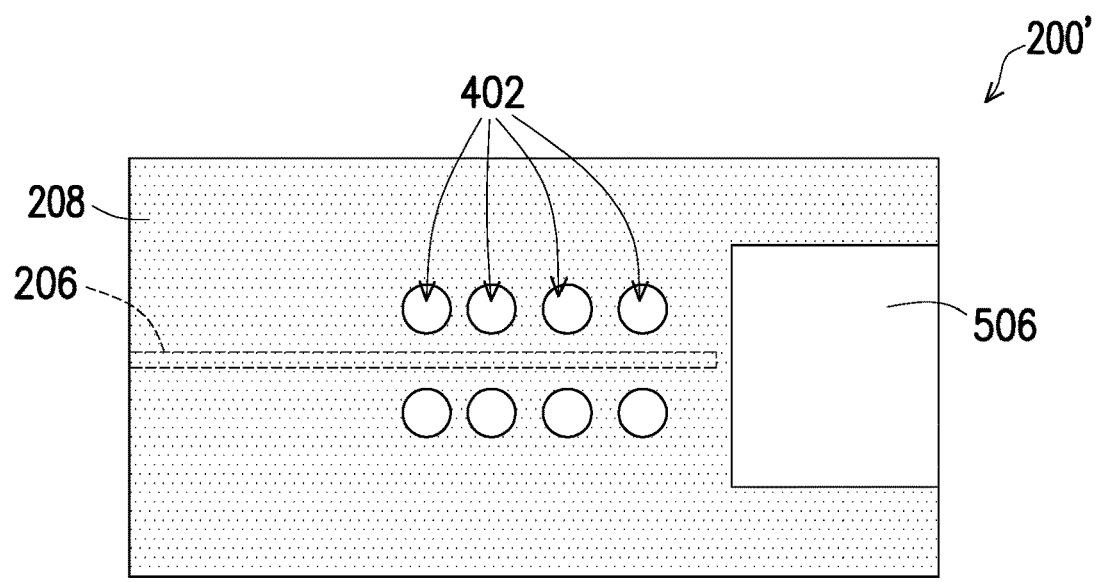
FIGS. 9 and 10 illustrate fragmentary top views other embodiments of a device during a fabrication process according to the method of FIG. 1, according to one or more aspects of the present disclosure.
Figure 10:
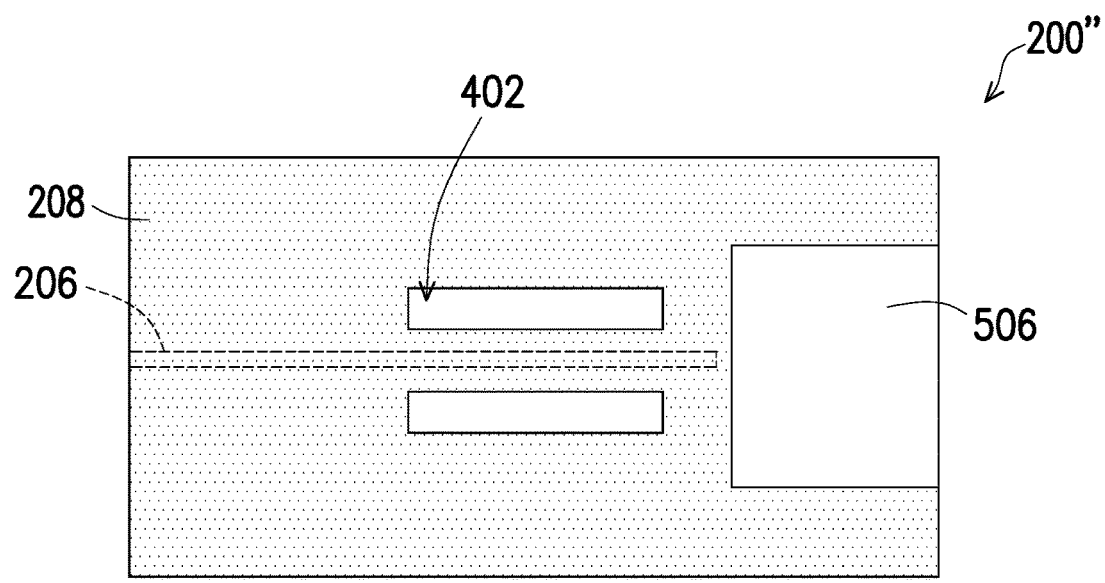

FIGS. 3A, 3B, 4A, 4B and the like above illustrate a configuration of release holes of the exemplary device 200. In an embodiment, illustrated as device 200', the configuration of the release holes includes a substantially circular shape, for example, as illustrated in FIG. 9. In an embodiment, a single release hole is positioned on one side of the core element of the waveguide and another release hole is positioned on the other side of the core element as illustrated in FIG. 10 in the device 200''. The release holes of FIG. 10 may similarly extend from a tapered portion of the core layer to a wide (e.g., w2) region of the core layer. The configuration of FIG. 10 may provide an increased dimension of the isolation space as compared to the device 200 or 200'.

The method 800 proceeds block 808 where the pattern of block 806 is implemented in a masking element as provided in the block 110 of the method 100 described above with reference to FIG. 1. Advantageously, in some embodiments, a single mask is used to define the pattern of the release holes and the location of the cavity.

The method 800 then proceeds to block 810 where the release holes, cavities, and isolation structure discussed above are etched as defined by the masking element and implemented by the etching process as discussed above in blocks 112 and 114 of the method 100 of FIG. 1 discussed above.

Thus, provided are structures and methods that include a waveguide having a cavity adjacent the waveguide in which a component such as a fiber may be disposed and precisely aligned with the waveguide. In some embodiments, an isolation space is formed under the waveguide contemporaneously with the cavity. Thus, in some implementations, a single masking element defines both the cavity and the release holes generating the isolation space. Similarly, the etch process(es) used to form the cavity and the isolation space may be concurrently performed. The isolation space may provide for benefits in some implementations such as reducing the optical signal loss from the waveguide, for example, by providing a refraction index that reflects lost light back to the core element of the waveguide. In some embodiments, the structure may provide a coupling efficiency between the waveguide and the component of greater than 70%. In an embodiment, the TE mode wave (Transverse Electric Wave) and TM mode wave (Transverse Magnetic Wave) of the propagating light have a coupling efficiency difference of less than 10%.

In one exemplary aspect, the present disclosure is directed to a structure including a waveguide including a cladding layer surrounding a core layer disposed over a substrate, a cavity extending into the substrate adjacent the waveguide, a fiber disposed in the cavity, and an isolation space extending into the substrate and disposed under the waveguide. In a further embodiment, a plurality of holes extending through the cladding layer adjacent the core layer. In an embodiment, the isolation space is contiguous with the cavity. In some implementations, the isolation space is filled with air. In some implementations, the isolation space interfaces the cladding layer. In an embodiment, the core layer has a tapered end having a first width narrowing to a second width less than the first width. In a further embodiment, the isolation space is vertically below the tapered end. In a further embodiment, the isolation space extends to be vertically below the first width.

In another of the broader embodiments, a structure includes a waveguide disposed over a substrate. The waveguide includes a core element having a main portion with a first width and a tapered end region having a width decreasing from the first width to a second width. An isolation space is disposed between the waveguide and the substrate. The isolation space interposes the main portion and the substrate and interposes the tapered end region and the substrate. A cavity is adjacent the tapered end region of the waveguide. A fiber is disposed in the cavity and aligned with the core element.

In a further embodiment, the fiber is aligned with the core element includes having an alignment of a respective center axis. The isolation space may be configured to reflect a wave to the core element. In an embodiment, a core element has a first refractive index and the isolation space has a second refractive index less than the first refractive index. In an embodiment, a waveguide further includes a cladding layer between the core element and the isolation space. In some implementations, a cladding layer has a third refractive index, the third refractive index is less than the first refractive index and greater than the third refractive index. In a further embodiment, a second refractive index is approximately 1.

In another of the broader embodiments, a method of fabricating a structure is provided that includes forming a waveguide having a core layer and a cladding layer over a substrate. A masking element is formed over the substrate. The masking element has a first opening defining a cavity and a plurality of second openings defining a plurality of release holes. The cladding layer is etched under the first opening and the plurality of second openings to concurrently form the plurality of release holes and an upper portion of the cavity. The substrate is etched under the plurality of release holes to form an isolation space.

In a further embodiment, the method further includes etching the substrate to extend the upper portion of the cavity to form a lower portion of the cavity. In an embodiment, the etching the cladding layer is an anisotropic etch process. In a further embodiment, the substrate is an isotropic etch process. The method in some implementations includes positioning a fiber in the cavity.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A structure, comprising:
   a waveguide including a cladding layer surrounding a core layer disposed over a substrate;
   a cavity extending into the substrate adjacent the waveguide;
   a fiber disposed in the cavity;
   an isolation space extending into the substrate and disposed under the waveguide; and
   a plurality of holes extending through the cladding layer and contiguous with the isolation space.

2. The structure of claim 1, wherein a first set of the plurality of holes are disposed adjacent a first side of the core layer in a top view, and a second set of the plurality of holes are disposed adjacent a second side of the core layer in the top view.

3. The structure of claim 1, wherein the isolation space is contiguous with the cavity.

4. The structure of claim 1, wherein the isolation space is filled with air.

5. The structure of claim 1, wherein the isolation space interfaces the cladding layer.

6. The structure of claim 1, wherein the core layer has a tapered end having a first width narrowing to a second width less than the first width, the isolation space under the second width.

7. The structure of claim 1, wherein the plurality of holes are filled with air.

8. The structure of claim 1, wherein the cavity is deeper than the isolation space.

9. The structure of claim 1, wherein the isolation space under the core layer has a scalloped surface.

10. The structure of claim 1, wherein the core layer has a first width, the first width being a greatest width of the core layer, and the core layer having a tapered end narrowing to a second width less than the first width, the isolation space extending under the first width and the second width.

11. The structure of claim 1, wherein the plurality of holes extend to a plane coplanar with a surface of the substrate.

12. The structure of claim 1, wherein the plurality of holes have a width between approximately 5 µm and 50 µm measured in a top view.

13. The structure of claim 1, wherein the plurality of holes have a circular shape in a top view.

14. The structure of claim 1, wherein the plurality of holes have a rectangular shape in a top view.

15. The structure of claim 1, wherein the plurality of holes include a first hole on a first side of the core layer in a top view and a second hole on a second side of the core layer in the top view.

16. A structure, comprising:
   a waveguide including a cladding layer surrounding a core layer disposed over a substrate;
   a cavity extending into the substrate adjacent the waveguide;
   a fiber disposed in the cavity;
   an isolation space extending into the substrate and disposed under the waveguide; and
   a plurality of holes extending through the cladding layer and contiguous with the isolation space, wherein each of the plurality of holes extend from an upper surface of the cladding layer to a lower surface of the cladding layer.

17. The structure of claim 16, wherein the plurality of holes have at least one of a rectangular shape or a circular shape in a top view.

18. A structure, comprising:
   a waveguide including a cladding layer surrounding a core layer disposed over a substrate, wherein the waveguide includes a tapered end;

a cavity extending into the substrate adjacent the waveguide;
a fiber disposed in the cavity;
an isolation space extending into the substrate and disposed under the tapered end of the waveguide; and
a plurality of holes extending through the cladding layer and contiguous with the isolation space.

19. The structure of claim 18, wherein, in a top view, a first hole of the plurality of holes is adjacent a first side of the tapered end of the waveguide and a second hole of the plurality of holes is adjacent a second side of the tapered end of the waveguide, wherein the second side is opposite the first side.

20. The structure of claim 18, wherein the plurality of holes are filled with air.

* * * * *